(12) United States Patent
Yoneta

(10) Patent No.: US 8,116,756 B2
(45) Date of Patent: Feb. 14, 2012

(54) METHOD FOR REDUCING INTERFERENCE BETWEEN ADJACENT SECTORS, AND BASE STATION APPARATUS

(75) Inventor: Tsuyoshi Yoneta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/477,654

(22) Filed: Jun. 3, 2009

(65) Prior Publication Data

US 2009/0239540 A1   Sep. 24, 2009

Related U.S. Application Data

(63) Continuation of application No. PCT/JP2006/324547, filed on Dec. 8, 2006.

(51) Int. Cl.
*H04W 4/00* (2009.01)

(52) U.S. Cl. ............ 455/422.1; 455/501; 455/436; 455/450; 455/561

(58) Field of Classification Search ............ 455/436, 455/522, 574, 127.1, 447, 442, 561, 277.1, 455/278.1, 562.1, 279.1; 370/311, 329, 328, 370/208, 334, 341, 344, 342; 340/7.32; 375/267, 375/150, 260, 146
See application file for complete search history.

(56) References Cited

U.S. PATENT DOCUMENTS

| | | | |
|---|---|---|---|
| 5,230,081 A * | 7/1993 | Yamada et al. ............ 455/456.3 |
| 5,483,667 A | 1/1996 | Faruque | |
| 6,011,787 A * | 1/2000 | Nakano et al. ............... 370/335 |
| 6,154,655 A | 11/2000 | Borst et al. | |
| 7,853,205 B2 * | 12/2010 | Papasakellariou ............ 455/23 |
| 2002/0119781 A1 | 8/2002 | Li et al. | |
| 2002/0159434 A1 * | 10/2002 | Gosior et al. .................. 370/350 |
| 2003/0013451 A1 * | 1/2003 | Walton ........................ 455/447 |
| 2003/0083069 A1 * | 5/2003 | Vadgama ..................... 455/436 |
| 2003/0174676 A1 * | 9/2003 | Willenegger et al. ......... 370/335 |
| 2003/0227889 A1 * | 12/2003 | Wu et al. ...................... 370/335 |
| 2004/0081131 A1 | 4/2004 | Walton et al. | |
| 2004/0131007 A1 | 7/2004 | Smee et al. | |
| 2004/0171407 A1 | 9/2004 | Ninomiya | |
| 2004/0179627 A1 | 9/2004 | Ketchum et al. | |
| 2004/0190482 A1 * | 9/2004 | Baum et al. ................... 370/347 |
| 2005/0048979 A1 * | 3/2005 | Chun et al. .................... 455/443 |

(Continued)

FOREIGN PATENT DOCUMENTS

EP   1043861 A1   2/2000

(Continued)

OTHER PUBLICATIONS

International Search Report dated Mar. 13, 2007.

*Primary Examiner* — Nick Corsaro
*Assistant Examiner* — Mahendra Patel
(74) *Attorney, Agent, or Firm* — Murphy & King, P.C.

(57) ABSTRACT

A cellular mobile communication system employs frequency multiplexing as a multiplexing system and adopts a sector configuration for cells. The cellular mobile communication system includes: a device for determining a scheduling turn of a local sector for a downlink scheduler of a base station apparatus; a device for acquiring assigned frequency information about adjacent sectors; a device for assigning a frequency to the local sector while considering the frequencies not used in the adjacent sectors; and a device for notifying about the result of the frequency assignment for the local sector. Thus, the interference between the sectors can be reduced and the frequencies can be effectively used.

12 Claims, 13 Drawing Sheets

U.S. PATENT DOCUMENTS

2005/0058151 A1* 3/2005 Yeh ............................... 370/445
2006/0115025 A1 6/2006 Kim et al.

FOREIGN PATENT DOCUMENTS

| | | |
|---|---|---|
| EP | 1043861 B1 | 2/2000 |
| JP | 3104430 | 5/1991 |
| JP | 5336027 | 12/1993 |
| JP | 11331929 | 11/1999 |
| JP | 2000286822 | 10/2000 |
| JP | 2001231074 | 8/2001 |
| JP | 2004266557 | 9/2004 |
| JP | 2004537875 | 12/2004 |
| JP | 200580286 | 3/2005 |
| JP | 2006515141 | 5/2006 |
| JP | 2006157928 | 6/2006 |
| JP | 2006517759 | 7/2006 |

* cited by examiner

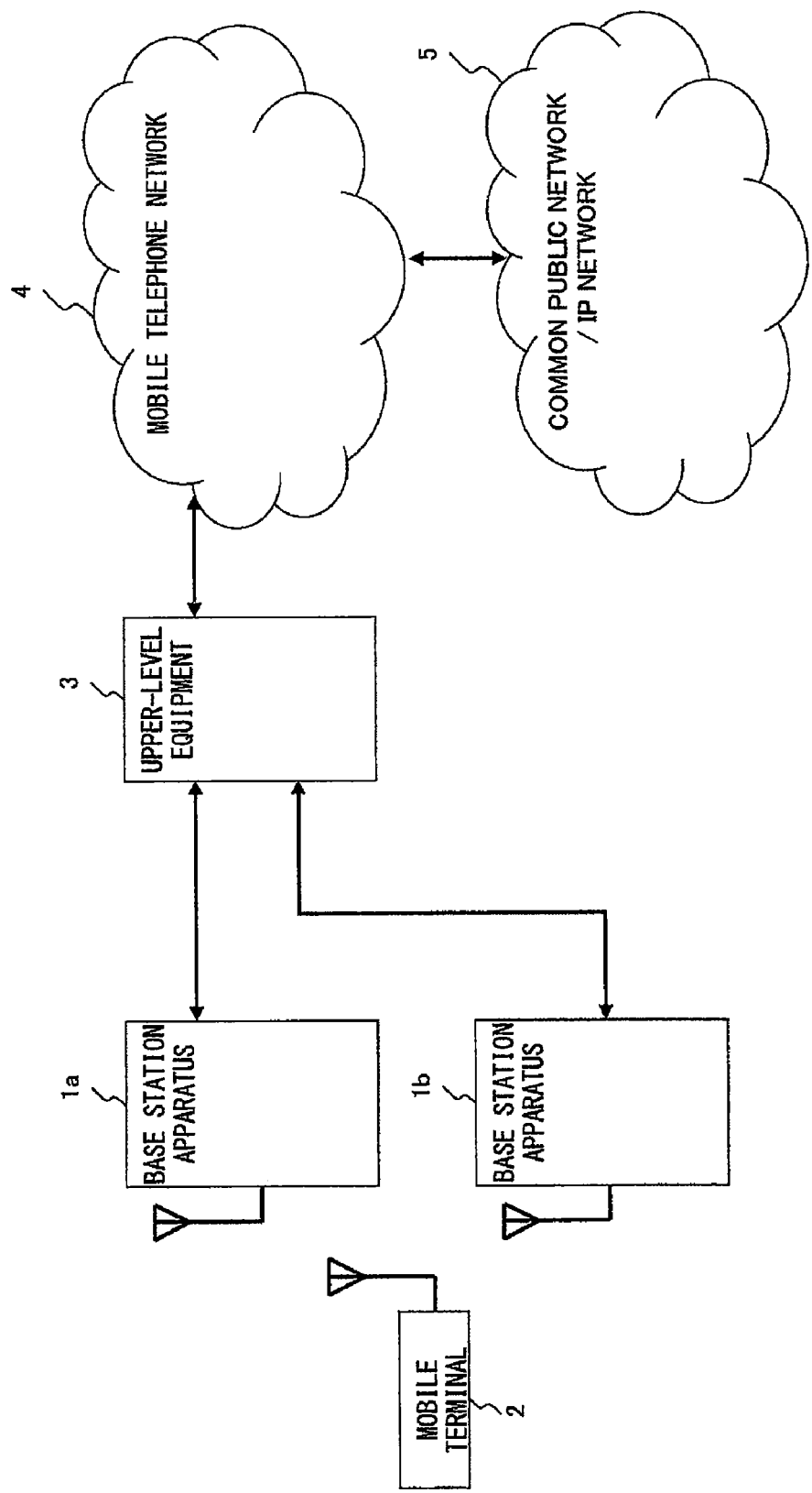
F I G. 1

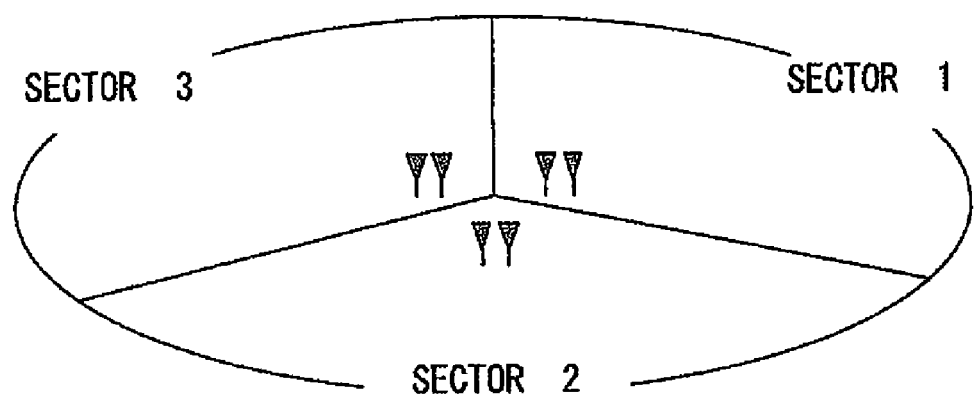
F I G. 3

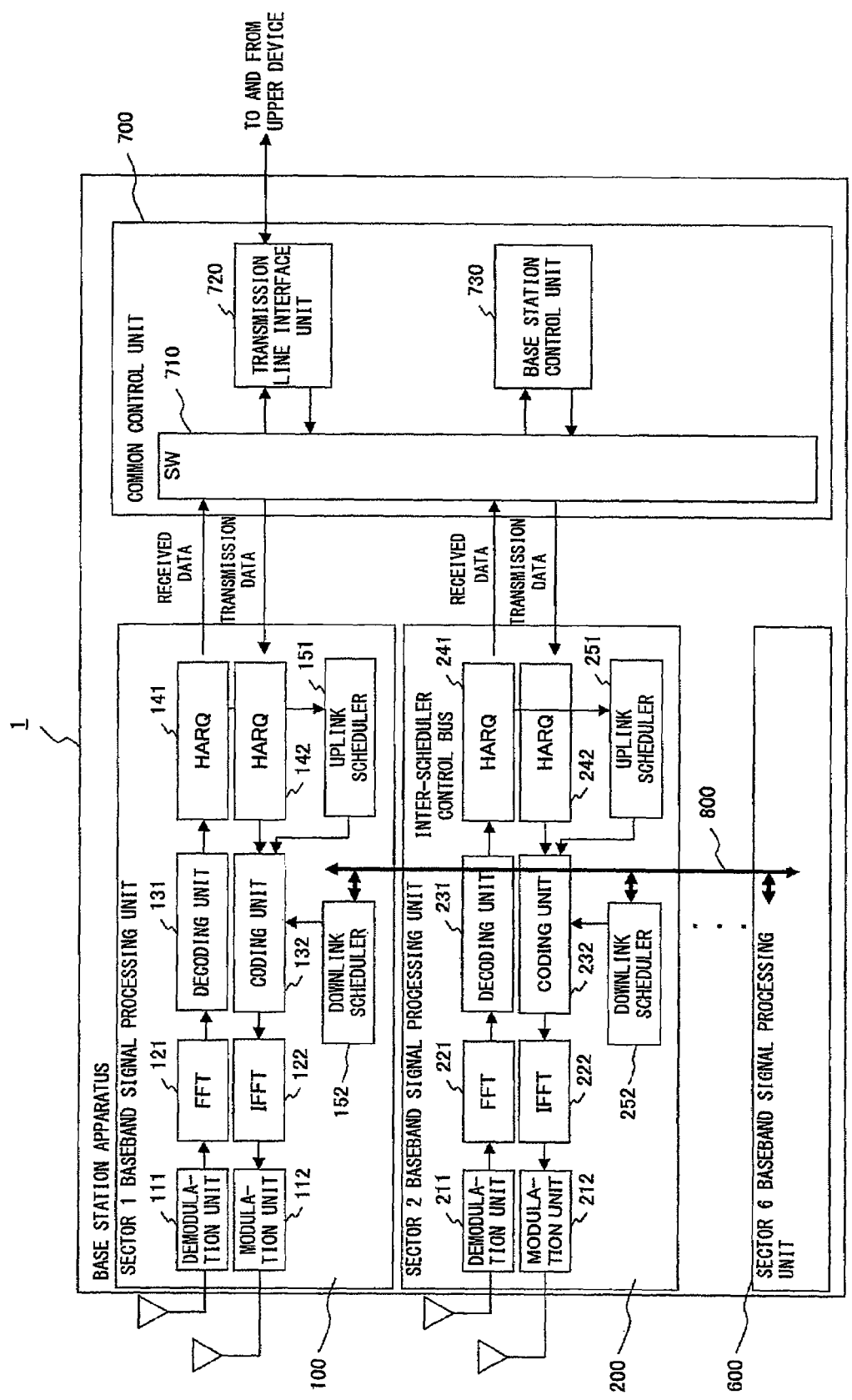
F I G. 5

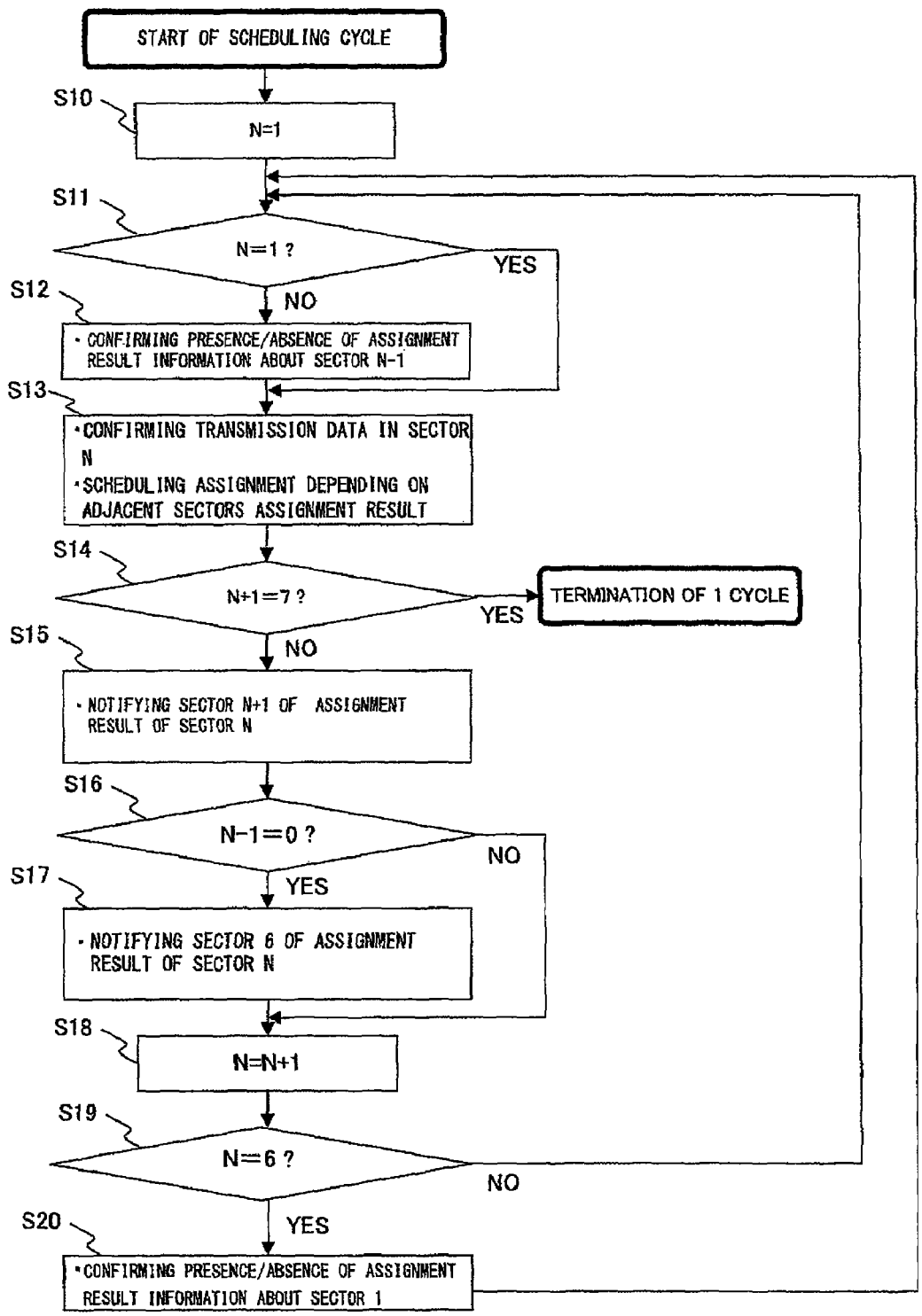
F I G. 7

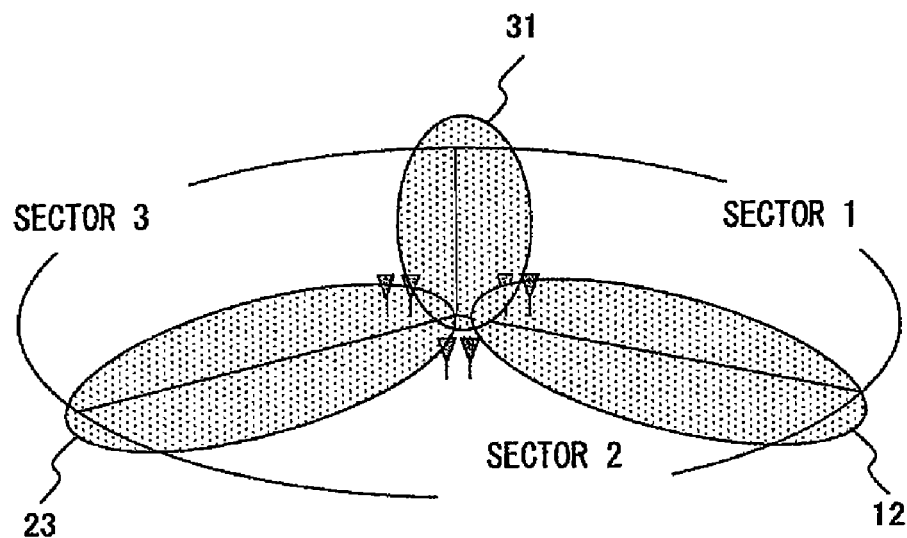
F I G. 1 0

METHOD FOR REDUCING INTERFERENCE BETWEEN ADJACENT SECTORS, AND BASE STATION APPARATUS

CROSS-REFERENCE TO RELATED APPLICATIONS

This application is a continuation application of International PCT Application No. PCT/JP2006/324547 which was filed on Dec. 8, 2006.

FIELD

The present invention relates to a method for reducing the interference between adjacent sectors in a cellular mobile telephone system (hereinafter referred to also as a mobile communication system) adopting frequency multiplexing as a multiplexing system like OFDMA (orthogonal frequency division multiple access) and having a sector configuration for a cell, and also relates to a base station apparatus.

BACKGROUND

The mobile communication system as a background of the present invention is described below with reference to FIGS. 1 through 4.

FIG. 1 illustrates an example of the system configuration of the mobile communication system relating to the present invention. The cellular mobile communication system configures a service area using a plurality of base station apparatuses.

As illustrated in FIG. 1, the mobile communication system is configures by an upper-level equipment 3, base station apparatuses 1a and 1b subordinate to the upper-level equipment 3, and a mobile terminal 2 interconnected over a mobile telephone network 4. The mobile telephone network 4 is connected to a common public network (or an IP network) 5.

FIGS. 2 and 3 illustrate an image of sector arrangement when a cell of a base station has a sector configuration. A sector is a fan-shaped space circularly expanding around the base station, and can be divided into three 120° sectors, six 60° sectors, etc. FIGS. 2 and 3 respectively illustrate six-sector and three-sector configurations of a sector arrangement image. The base station apparatus is provided with an antenna having the directivity of covering the fan-shaped area of the sector for each sector.

Currently, in the 3GPP ($3^{rd}$ generation partnership project), evolved UTRA and UTRAN relating to a wireless access system and a wireless access network system has been studied as a next generation mobile communication system. In the wireless communication system, the OFDMA is likely to be adopted in the downlink direction.

The OFDMA is a method in which a user can access a transmission line in the OFDMA (orthogonal frequency division multiple) modulation method.

In the OFDMA, a plurality of users share subcarriers, and a high transmission efficiency subcarrier is to be assigned to each user. In this case, it is not common to control each of a number of subcarriers, but a frequency is assigned to a bundle of some consecutive subcarriers. The bundle of subcarriers is referred to as a resource block.

FIG. 4 illustrates a concept of a resource block of the OFDMA. The resource block is obtained by collecting fine subcarriers for 200 kHz through 300 kHz and sectioning them by time. In FIG. 4, the resource blocks sectioned by the same type of line is assigned to the same mobile terminal. The base station apparatus assigns the resource block as the smallest unit in the direction of frequencies and the direction of time. Therefore, the data transmitted in the time unit configures one subframe. The interval in which the subframe is transmitted refers to a TTI (transmission time interval) as a time unit in which data is continuously transmitted at a time.

The base station apparatus transmits the transmission data prepared for each TTI to each mobile terminal. At this time, depending on the amount of data used for each mobile terminal that changes with time, a frequency is assigned to each mobile terminal by the resource block as illustrated in FIG. 4. The assignment control is referred to as scheduling, and the base station apparatus practically controls the assignment.

The following patent document 1 discloses the prior art relating to the assignment of subcarriers in the OFDMA, and the patent documents 2 and 3 disclose the prior art of the mobile communication system having the sector configuration.

Patent Document 1: National Publication of International Patent Application No. 2004-537875
Patent Document 2: Japanese Laid-open Patent Publication No. 2000-286822
Patent Document 3: Japanese Laid-open Patent Publication No. 05-336027

SUMMARY

In the OFDMA, when data is transmitted by repeatedly using in all cells all areas of the frequency band allocated to the entire system, the interference between the adjacent cell is to be considered. Especially, since central control can be performed on the sectors in one base station, it is desired that any means is applied to reduce the interference.

In an IMT-2000 system in which the S-CDMA method is applied as a wireless system, each sector can be identified by a diffusion code in the downlink transmission, and there is no problem of reducing the interference between sectors only by considering the arrangement of codes between the sectors. Especially, in the W-CDMA method, a handover procedure of improving the reception characteristic by simultaneously transmitting same information from a plurality of sectors and combining individually received signals is used, and the information from the plurality of sectors is positively received simultaneously at a terminal using the same frequency.

However, in the case of the OFDMA signal, the configuration of transmitting the same information about the plurality of sectors from the base station makes no difference in frequency use efficiency from the configuration of the omni-cells having no cell configuration, thereby failing in effectively using frequencies. Accordingly, as described above, when the OFDMA is used in a radio region, and all areas of the frequency bands allocated to the entire system in all cells and all sectors are repeatedly used in the transmission process, it is desired to apply the technology of reducing the interference at least between sectors.

Therefore, in the prior art, the frequency in the entire system is divided into some bands, and the divided frequency is assigned to each sector in advance. When the frequency is assigned, the same frequency is not assigned to adjacent sectors, thereby suppressing the interference between the adjacent sectors.

However, this method has the drawback of reducing the use efficiency of the frequencies.

In the situation above, the present invention aims at providing a frequency assigning system capable of effectively using frequencies and reducing the interference between sectors.

In the method provided by the present invention, a frequency is assigned to the sectors in the same base station with the assignment state of the adjacent sectors taken into account. To realize this, the assignment process is performed by starting with a given sector, performing control in, for example, the ascending order of sector numbers, and constantly picking up the frequency not used in the adjacent sectors.

By adopting the present invention, in a wireless system in which frequency multiplexing, especially the OFDMA of transmitting data repeatedly using all areas of the frequency bands assigned to the entire system in all cells is used, the frequencies can be effectively used and the interference between sectors can be reduced although the base station apparatus has a sector configuration and the number of accommodated users is to be increased.

BRIEF DESCRIPTION OF DRAWINGS

FIG. 1 illustrates an example of the system configuration of the mobile communication system;

FIG. 3 illustrates an image of the arrangement of sectors when a 3-sector configuration is used;

FIG. 5 illustrates an example of the internal configuration of the base station apparatus realizing the present invention;

FIG. 7 illustrates an example of a process flow of the scheduling according to an embodiment in the first mode for embodying the invention;

FIG. 10 illustrates an image of an FCS area in a cell having a sector configuration;

DESCRIPTION OF EMBODIMENTS

Figure 2:
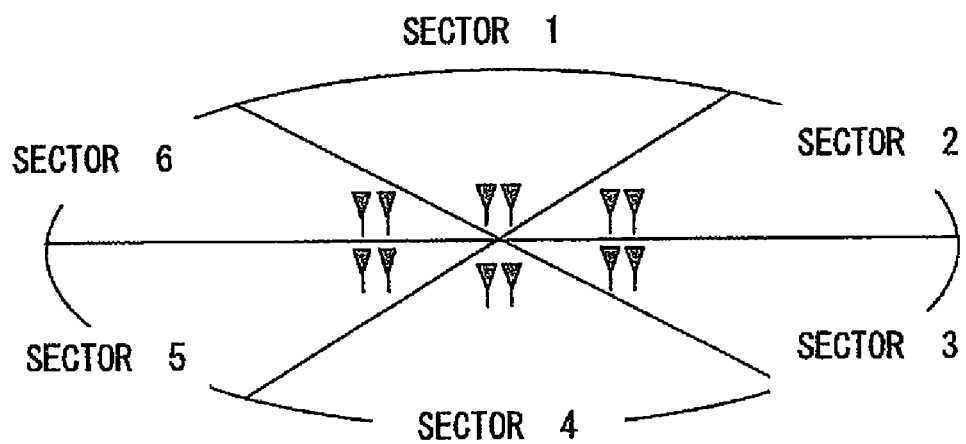
FIG. 2 illustrates an image of the arrangement of sectors when a 6-sector configuration is used.
Figure 4:
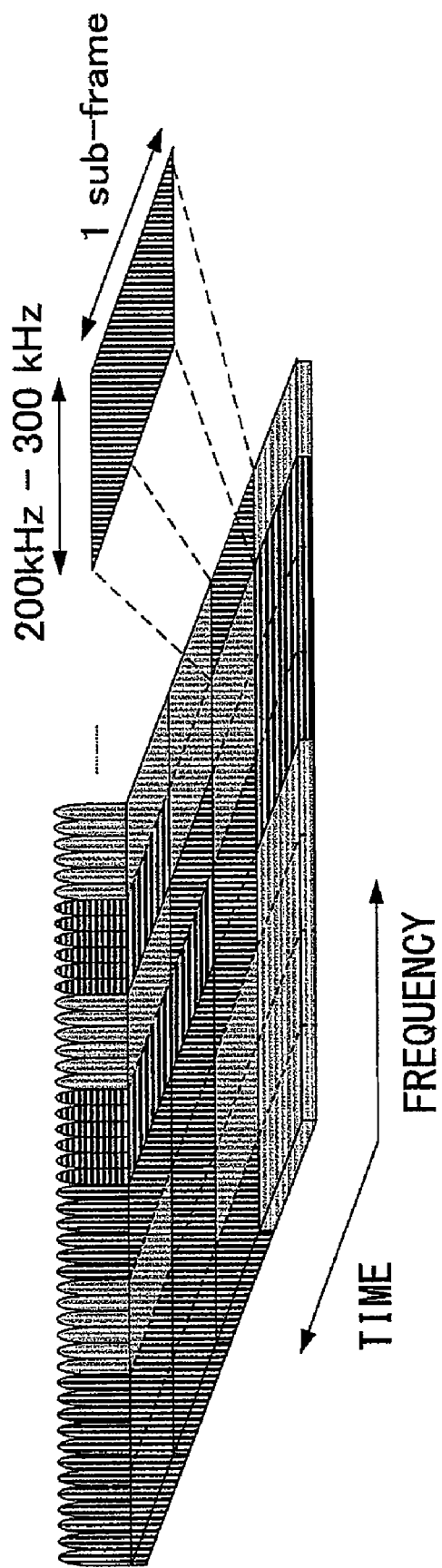
FIG. 4 illustrates the concept of the resource block of the OFDMA.

FIG. 5 illustrates an example of the internal configuration of the base station apparatus 1 realizing the present invention. As illustrated in FIG. 5, the base station apparatus 1 having the 6-sector configuration is configured to include baseband signal processing units 100 through 600 for each of sectors 1 through 6, a common control unit 700, and an inter-scheduler control bus 800 for connecting the common control unit 700 to each of the baseband signal processing units 100 through 600.

The inter-scheduler control bus 800 is newly provided for the present invention, and each of the baseband signal processing units 100 through 600 exchange the information between the sectors through the inter-scheduler control bus 800.

The baseband signal processing units 100 through 600 for each sector have the same configurations as illustrated by the baseband signal processing units (100, 200) of the sectors 1 and 2 in FIG. 5.

The baseband signal processing units (100, 200) is configured by including: demodulation units (111, 211) for demodulating a radio signal from the mobile terminal 2 and obtaining a baseband signal; FFT units (121, 221) for performing a fast Fourier transform on the demodulated baseband signal; decoding units (131, 231) for decoding the output of the FFT units (121, 221); receiver error control units (141, 241) for performing error control on the output of the decoding units (131, 231) and retrieving received data; transmitter error control units (142, 242) for performing error control on transmission data; coding units (132, 232) for coding the error controlled transmission data; IFFT units (122, 222) for performing an inverse fast Fourier transform on the output of the coding units (132, 232); modulation units (112, 212) for modulating a signal processed by the inverse fast Fourier transform and outputting a radio signal; uplink schedulers (151, 251) for acquiring the information about a control signal requiring a reply from the receiver error control units (141, 241); uplink schedulers (151, 251) for scheduling the transmission of a reply signal; and downlink schedulers (152, 252) for scheduling transmission data in the downlink direction while exchanging information with sectors.

For example, a hybrid ARQ (hybrid automatic request) is used in the error control performed by the receiver error control units (141, 241) and the transmitter error control units (142, 242).

The common control unit 700 is configured by including: a switch unit 710 for switching transmission/received data between each of the baseband signal processing units 100 through 600 and the upper-level equipment 3; a transmission line interface unit 720 for a transmission line to the upper-level equipment 3; and a base station control unit 730 for controlling the entire base station apparatus 1.

An example of the configuration of the base station apparatus 1 illustrated in FIG. 5 corresponds to the OFDMA adopted in the wireless system in the downlink direction, but the configuration corresponding to the frequency multiplexing method is accepted without limit to the OFDMA so far as a downlink scheduler for assigning a frequency of each sector and the inter-scheduler control bus 800 for connection between downlink schedulers are provided.

The scheduling in each mode for embodying the invention is described below with reference to FIGS. 6 through 13.

Figure 6:
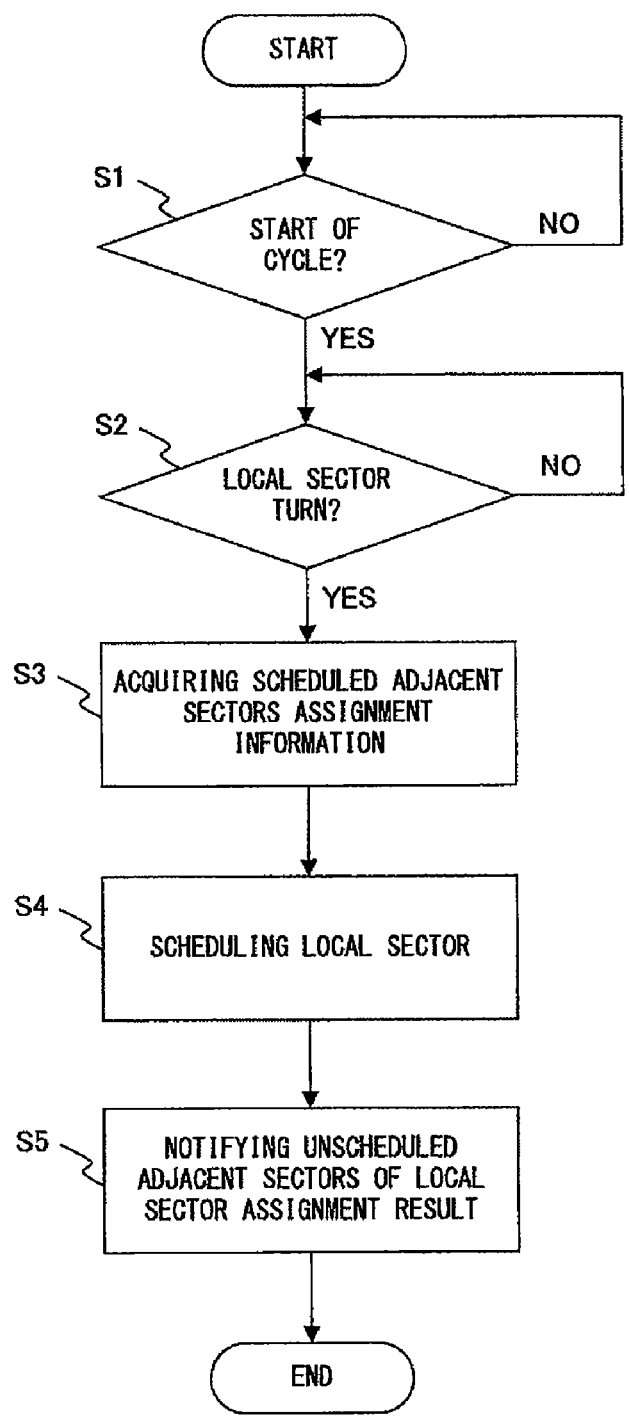
FIG. 6 illustrates an example of a process flow of the scheduling in the first mode for embodying the invention.

FIG. 6 illustrates an example of a process flow of the scheduling in the first mode for embodying the invention. The scheduling in the base station apparatus is started with given timing, and is performed by a downlink scheduler for each sector configuring a cell of the base station apparatus. If the scheduling turn execution cycle of the entire cells is hereinafter referred to as a scheduling cycle or simply a cycle, then the scheduling cycle in the OFDMA is started for each TTI described above, and a resource block is assigned.

In step S1 in FIG. 6, the cycle start timing is awaited, and when the cycle start timing is reached, it is determined in step S2 whether or not it is the scheduling turn of the local sector. The determination of the turn can be made by each sector storing the turn M of the sector, counting the common variable N to each sector indicating the turn from 1 each time the scheduling for each sector is terminated, and determining whether or not the value of the variable N is equal to the turn M of the sector.

If it is determined in step S2 that it is the scheduling turn of the local sector, then the frequency assignment information about the adjacent sectors scheduled in step S3 is acquired.

Then, control is passed to step S4, and the scheduling is performed for the frequencies other than those assigned to the adjacent sectors according to the frequency assignment information about the adjacent sectors acquired in step S3, and a frequency is assigned.

Then, control is passed to step S5, and the adjacent sectors not yet scheduled are notified of the frequency assignment information as a scheduling result of the local sector, thereby terminating the process.

The notification of the scheduling result is not limited to the adjacent sectors not scheduled yet, but can be transmitted to simply adjacent sectors or all sectors. In this case, in step S3, the assignment information from the activated adjacent sectors is selected from the notified assignment information.

FIG. 7 illustrates an example of the scheduling process flow of the embodiment in which a scheduling start sector in the scheduling cycle is fixed. In the example illustrated in FIG. 7, the scheduling is performed in the ascending order from the sector having the sector number 1, the number of sectors is six, and the configuration of the base station apparatus is illustrated in FIG. 5. In the example, the scheduling turn M of the local sector is equal to the sector number N of the local sector.

First in step S10, the variable N indicating the scheduling turn is set to the initial value 1. As described above, since the scheduling is started from the sector having the sector number 1, the variable N also refers to the sector number, and each scheduler performs a practical process such as the scheduling etc. when the value of the variable N equals the sector number of the local sector.

Next in step S11, it is determined whether or not N=1. If N=1, control is passed to step S13. Otherwise, control is passed to step S12.

In step S12, the assignment result information about the sector N−1 is confirmed through the inter-scheduler control bus 800. In this step, the downlink scheduler having the sector number N corresponding to the current scheduling turn refers to the scheduling result of the preceding sector immediately before the local sector, and the operations relating to the sector number N in the subsequent steps are performed by the downlink scheduler having the sector number N corresponding to the current scheduling turn. It holds true with the examples of the scheduling process flows illustrated in FIGS. 9 and 12 described later.

In step S13, the transmission data in the sector N, that is, the local sector, is confirmed. Then, the scheduling is performed using the resource block not assigned by the adjacent sectors, and the resource block is assigned to the transmission data in the local sector. In this case, it is necessary in the sectors except the sector 1 to consider the assignment result information about the sector N−1 as the adjacent sectors confirmed in step S12.

Then, in step S14, it is determined whether or not N+1 equals 7, that is, whether or not the value of the current variable N is 6. If it is 6, the scheduling process in 1 cycle from the entire cells N=1 to N=6 is terminated.

If the determination in step S14 is NO, control is passed to step S15, and the assignment result of the sector N is transmitted to the sector N+1 through the inter-scheduler control bus 800 illustrated in FIG. 5. That is, the assignment result of the local sector is transmitted to the downlink scheduler of the sector having the sector number larger by 1 than the local sector.

Next in step S16, it is determined whether or not N−1 equals 0, that is, whether or not the value of the current variable N is 1. If the determination result is NO, control is passed to step S18. If the determination result is YES, control is passed to step S17.

In step S17, the downlink scheduler of the sector 1 notifies the downlink scheduler of the sector 6 of the assignment result of the resource block of the sector 1.

In step S18, N=N+1, and the value of the variable N is incremented by 1.

Next in step S19, it is determined whether or not the value of the variable N is 6. If N is not 6, control is returned to step S11. If N=6, in step S20, the downlink scheduler of the sector 6 confirms the presence/absence of the assignment result information about the resource block of the sector 1 notified in step S17, and control is returned to step S11.

In the flowchart illustrated in FIG. 7, the destination back from steps S19 and S20 is step S11. However, it is also possible to obtain the same result by returning control to step S13 after performing the process in step S12, deleting the determining process in step S11, and passing control from step S10 to step S13.

As described above, each scheduler basically performs a similar process, but performs different processes from those of other schedulers in that the downlink scheduler of the sector 1 notifies the downlink scheduler of the sector 6 in addition to the downlink scheduler of the sector 2 of the resource block assignment result of the local sector, and that the downlink scheduler of the sector 6 performs the scheduling on the basis of the resource block assignment result of the sector 1 in addition to the resource block assignment result of the sector 5.

Therefore, the priority of the sector 1 is the highest in assigning a resource block, and the priority of the sector 6 is the lowest.

Described below is an example of a variation for the fairness in assigning resource blocks among the sectors.

In the first variation example, the scheduling start sector is not fixed, but the leading sector for starting the scheduling is sequentially changed for each scheduling cycle. It can be attained by updating one by one the scheduling turn M of the local sector for each scheduling cycle.

For example, if the scheduling is performed from the sector 1 in a cycle, then the sector for first performing the scheduling in the ascending order of the sector number is shifted to next start the scheduling from the sector 2, thereby fairly performing the scheduling among the sectors. It is obvious that the sector for first scheduling in the descending order of the sector number can be shifted.

In the second variation example, each of two adjacent sectors can be a first scheduling sector alternately. Since the scheduling is to be considered for the assignment of resource blocks of the adjacent sectors, the effect of fairness similar to that of the variation example 1 can be realized.

The scheduling turn M of the local sector in the second variation example is alternately switched to M+1 in every scheduling cycle, or can be alternately set to the first and last values.

In the third variation example, the patterns of the scheduling turns of sectors are determined at random. After a lapse of sufficient time, the fairness in the scheduling priority can be maintained.

The scheduling turn M in the third variation example can be determined for each scheduling cycle by the base station control unit 730 as illustrated in, for example, FIG. 5, and can be set for the downlink scheduler of the baseband signal processing units 100 through 600 of each sector.

The scheduling process flow in the above-mentioned variation examples 1 through 3 is the same as the flow of the embodiment illustrated in FIG. 7, and only the method of determining the scheduling turn M is different.

Next, the second mode for embodying the invention is described below with reference to FIGS. 8 and 9. In the second mode for embodying the invention, when the scheduling of the local sector is performed, it is performed on the basis of the amount of transmission data of the local sector and the amount of transmission data of the adjacent sector to be scheduled subsequently.

Figure 8:
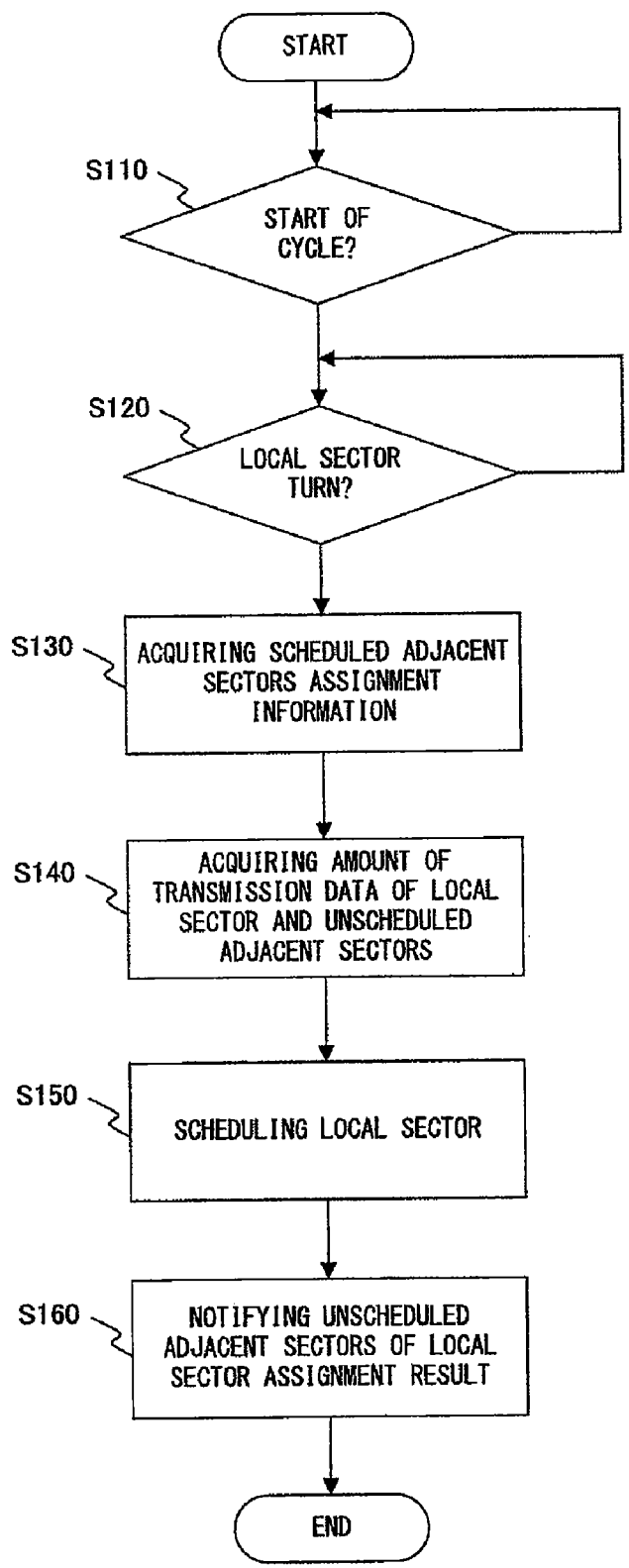
FIG. 8 illustrates an example of a process flow of the scheduling in the second mode for embodying the invention.

FIG. 8 illustrates an example of a process flow of the scheduling in the second mode for embodying the invention. As compared with the example of the process flow of the scheduling in the first mode for embodying the invention illustrated in FIG. 6, the example of the process flow of the scheduling in the second mode for embodying the invention is different from the example of the process flow of the scheduling in the first mode for embodying the invention in that step S140 of acquiring the amounts of transmission data of the local sector and the adjacent sectors not yet scheduled is provided, and that the scheduling is performed on the basis of the amount of transmission data acquired in step S140 at a frequency other than the frequency assigned to the adjacent sectors, and a frequency is assigned in step S150 of scheduling the local sector. Since the examples are otherwise the same with each other, and the description is omitted here.

Figure 9:
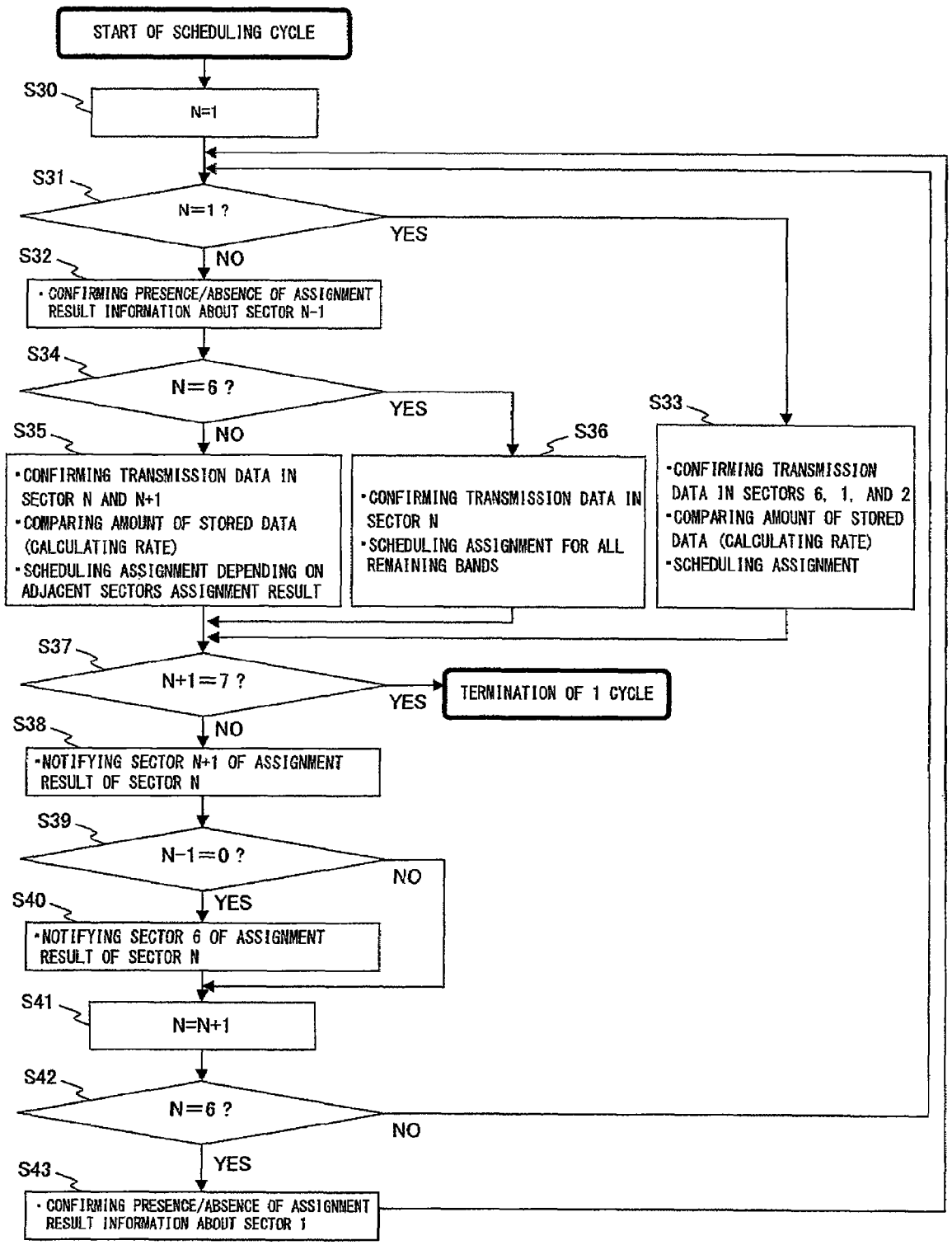
FIG. 9 illustrates an example of a process flow of the scheduling according to an embodiment in the second mode for embodying the invention.

FIG. 9 illustrates an example of the process flow of the scheduling in which a first scheduling sector in the scheduling cycle is fixed in the second mode for embodying the invention and the scheduling on the basis of the amount of transmission data is the scheduling on the basis of the rate of the amount of transmission data. In the example illustrated in FIG. 9, as with the example illustrated in FIG. 7, the scheduling is performed in the ascending order from the sector having the sector number 1, the number of sectors is six, the configuration of the base station apparatus is illustrated in FIG. 5, and the scheduling turn M of the local sector described above is equal to the sector number N of the local sector.

First in step S30, the variable N is set to the initial value 1. As described above, the variable N also refers to the sector number, and each downlink scheduler perform practical processing such as the scheduling etc. when the value of the variable N is the sector number of the local sector.

Next, in step S31, it is determined whether or not N=1. If N=1, control is passed to step S33. Otherwise, control is passed to step S32.

In step S32, the presence/absence of the assignment result information of the sector N−1 is confirmed, and control is passed to step S34.

In step S33, since N=1, the transmission data in the local sector 1 and the transmission data of the sectors 6 and 2 as the adjacent sectors not yet scheduled are confirmed, the respective amounts of stored data are acquired, the amounts of stored data are compared with each other, and the resource blocks are assigned depending on the ratio of the amount of stored data of the local sector 1, thereby performing the scheduling. Then, control is passed to step S37.

Assume that the number of resource blocks of the entire system is Z, the number of resource blocks corresponding to the amount of stored transmission data of the sector 1 is A, the number of resource blocks corresponding to the amount of stored transmission data of the sector 2 is B, and the number of resource blocks corresponding to the amount of stored transmission data of the sector 6 is X.

Then, the number of resource blocks that can be assigned to the mobile terminal of the local sector of the sector 1 is $(A/A+B+X)*Z$. Therefore, if $A+B+X \leq Z$, all stored transmission data can be transmitted. Otherwise, all transmission data cannot be transmitted in the cycle, but the next scheduling cycle is awaited.

In any way, when the sector 2 performs the scheduling, $Z-(A/A+B+X)*Z$ or more resource blocks remain unassigned.

Since the sector 6 is affected by the amount of stored transmission data of the sector 5, the number of resource blocks that can be assigned cannot be immediately increased by decreasing the number of assigned resource blocks in the sector 1. However, since the resource blocks assigned in sector 1 cannot be used in the sector 6, the reduction of the number of assigned resource blocks in the sector 1 urges the number of resource blocks that can be assigned in the sector 6 to increase.

If the amount of stored transmission data of the sector 6 largely increases and exceeds a threshold, then measures of decreasing the rate of the number of resource blocks assigned in the sector 1 below the proportional allocation can be adopted.

In step S34, it is determined whether or not N=6. If N=6, control is passed to step S36. Otherwise, control is passed to step S35.

In step S35, the transmission data of the sector N as the local sector and the transmission data of the sector N+1 are confirmed, the respective amounts of stored data are compared with each other, and the scheduling is performed depending on the resource blocks not assigned in the adjacent sectors on the basis of the assignment result information about the sector N−1 as the adjacent sector confirmed in step S32 depending on the rate of the amount of stored data of the local sector N, thereby assigning the resource blocks to the transmission data in the local sector. Then, control is passed to step S37.

Assuming that the number of resource blocks corresponding to the amount of stored transmission data of the sector N is C and the number of resource blocks corresponding to the amount of stored transmission data of the sector N+1 is D, the number of resource blocks that can be assigned to the mobile terminal of the local sector of the sector N is $(C/C+D)*Z$.

For simplicity, if X=0 in step S33, the calculated number of resource blocks in sector 2 that can be assigned in step S33 is $(B/A+B)*Z$. Since the number of assigned resource blocks in step S35 is $(B/B+D)*Z$ because B=C. Thus, if the amount of stored transmission data of the sector 3 is larger than the amount of stored transmission data of the sector 1, the number of resource blocks that can be assigned in the sector 2 decreases. If the amount of stored transmission data of the sector 3 is smaller than the amount of stored transmission data of the sector 1, then the number of resource blocks that can be assigned in the sector 2 increases. The relationship similarly holds true with the case in which N=3~5.

In step S36, since N=6 and the sector is the last in the scheduling turn, all remaining bands are used in performing the scheduling, and the resource blocks are assigned to the transmission data of the local sector. Then, control is passed to step S37.

The steps in and after step S37 are the same as the steps in and after step S14 in the example of the scheduling process flow of the embodiment of the first mode for embodying the invention illustrated in FIG. 7. It is determined in step S37 whether or not N+1 equals 7, that is, whether or not the value of the current variable N is 6. If it is 6, the process of one cycle from N=1 to N=6 is terminated.

If the determination in step S37 is NO, control is passed to step S38, and the assignment result of the sector N is transmitted to the sector N+1 through the inter-scheduler control bus 800. That is, the assignment result of the local sector is transmitted to the downlink scheduler of the sector having a number larger by 1 than the local sector.

Next in step S39, it is determined whether or not N−1 equals 0, that is, whether or not the value of the current variable N is 1. In the determination result is NO, control is passed to step S41. If it is YES, control is passed to step S40.

In step S40, the downlink scheduler of the sector 1 notifies the downlink scheduler of the sector 6 of the assignment result of the resource blocks of the sector 1.

In step S41, N=N+1, and the value of the variable N is incremented by 1.

Next, in step S42, it is determined whether or not the value of the variable N is 6. Unless N=6, control is returned to step S31. If N=6, the presence/absence of the resource block assignment result information about the sector 1 notified in step S40 is confirmed in step S43, and control is returned to step S31.

The embodiments of the second mode for embodying the invention are described above, but it is obvious that the variable examples 1 through 3 similar to those in the first mode for embodying the invention can be realized in the second mode for embodying the invention.

Next, the third mode for embodying the invention is described below with reference to FIGS. 10 through 12. The third mode for embodying the invention is based on the mobile communication system in which the handover between sectors by a fast cell selection (FCS) is implemented. The mobile terminal as a target of the FCS is located at the sector boundary, and the base station apparatus of the mobile communication system recognizes which mobile terminal is an FCS terminal.

The third mode for embodying the invention perform the scheduling by separating the scheduling for the FCS terminal from the scheduling for a terminal other than a terminal other than the FCS.

FIG. 10 illustrates an image of an FCS area in a cell having a sector configuration. The shaded areas are an FCS area 12 spanning the sectors 1 and 2, an FCS area 23 spanning the sectors 2 and 3, and an FCS area 31 spanning the sectors 3 and 1.

In the third mode for embodying the invention, an FCS terminal located in the FCS area at the scheduled adjacent sectors is affected by the scheduling results of the adjacent sectors, but other mobile terminals are not affected by the scheduled adjacent sectors including the FCS terminals at the unscheduled adjacent sectors.

For simplicity, an FCS terminal located in the FCS areas at the scheduled adjacent sectors is referred to simply as an FCS terminal, and other terminals can be referred to simply as a non-FCS terminal.

Figure 11:
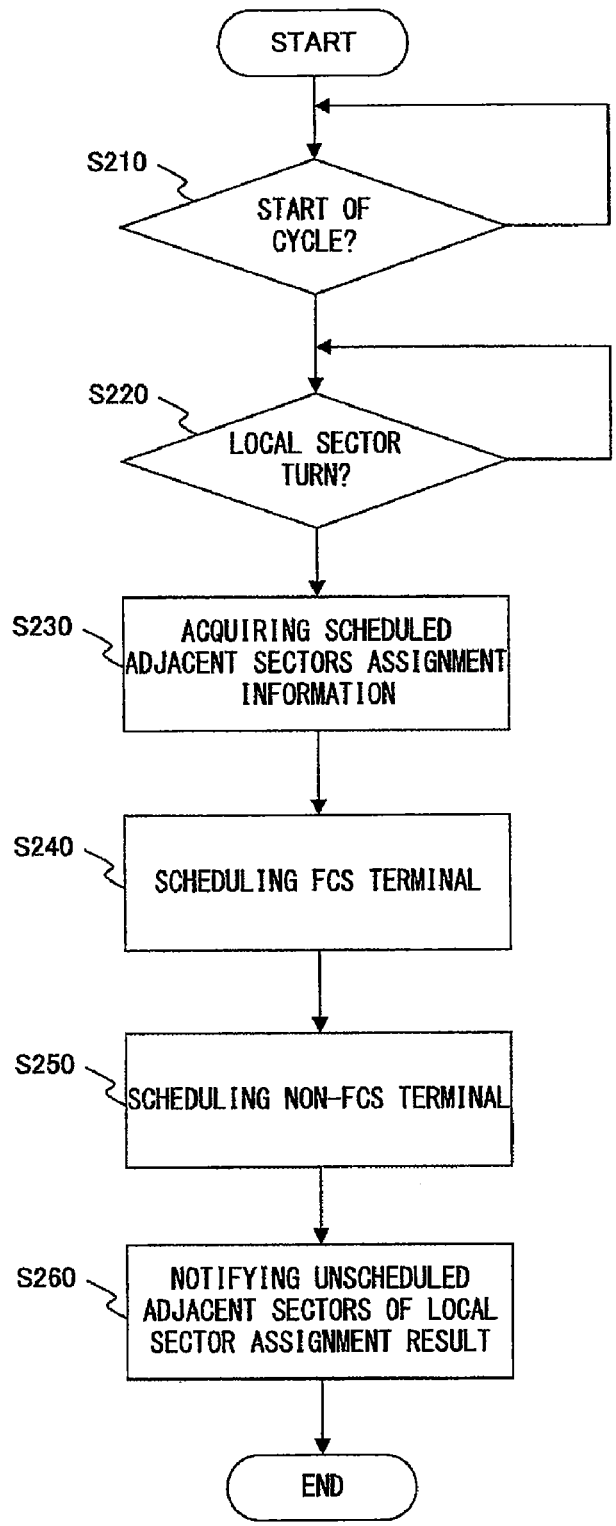
FIG. 11 illustrates an example of a process flow of the scheduling in the third mode for embodying the invention.

FIG. 11 illustrates an example of a process flow of the scheduling in the third mode for embodying the invention. As compared with the example of a process flow of the scheduling in the first mode for embodying the invention illustrated in FIG. 6, the processes in step S210 through step S230 and step S260 of the example of a process flow of the scheduling in the third mode for embodying the invention correspond to the processes in step S1 through step S3 and step S5 of the example of a process flow of the scheduling in the first mode for embodying the invention. In addition, the example of a process flow of the scheduling in the third mode for embodying the invention is different from the example of a process flow of the scheduling in the first mode for embodying the invention in that the scheduling of the local sector is separated into the scheduling for the FCS terminal in step S240 and the scheduling for the non-FCS terminal in step S250 as compared with the process in step S4 in which the scheduling of the local sector of the example of a process flow of the scheduling is performed in the first mode for embodying the invention.

In the scheduling for an FCS terminal in step S240, the scheduling is performed according to the assignment information acquired in step S230.

In step S250, the non-FCS terminal is away from the sector boundary of the scheduled adjacent sectors, and is not affected by the adjacent sectors. Therefore, the scheduling is performed using all remaining bands in the frequency area assigned in step S240.

In step S260, the scheduling result obtained in step S250 can be transmitted as a result of the frequency assignment to unscheduled adjacent sectors, but the frequency can be more effectively used by transmitting to the FCT terminal at the unscheduled adjacent sectors the frequency assignment information as a result of the frequency assignment of the local sector from among the assigned frequencies in step S250.

The frequency assignment information about the adjacent sectors acquired in step S230 is notified by performing the process in step S260 on the adjacent sectors.

Figure 12:
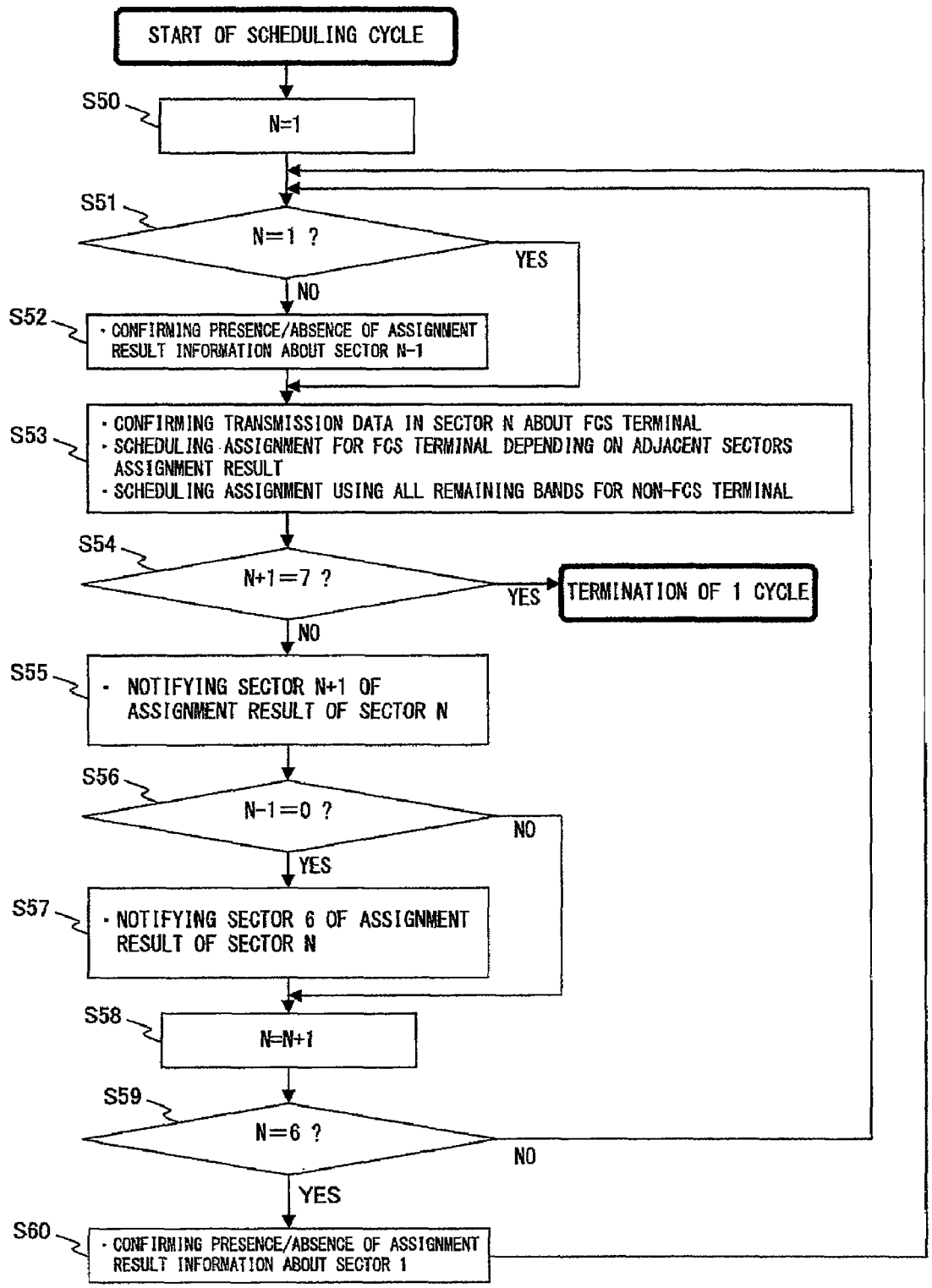
FIG. 12 illustrates an example of a process flow of the scheduling according to an embodiment in the third mode for embodying the invention.

FIG. 12 is an example of a process flow of the scheduling of the embodiment in which a scheduling start sector is fixed in the scheduling cycle. In the example illustrated in FIG. 12, as with the example illustrated in FIG. 7, the scheduling is performed in the ascending order from the sector having the sector number 1, the number of sectors is 6, and the configuration of the base station apparatus is illustrated in FIG. 5. In this example, the scheduling turn M of the local sector is equal to the sector number N of the local sector.

As compared with the example illustrated in FIG. 7, the processes in step S50 through step S60 in the example illustrated in FIG. 12 correspond to the processes in step S10 through step S20 in the example illustrated in FIG. 7.

However, the process in step S53 illustrated in FIG. 12 as a scheduling step of the local sector N is the scheduling performed on the basis of the assignment result of the sector N−1 only on the FCS terminal using all resource blocks remaining after the scheduling for the FCS terminals on the non-FCS terminals.

The processes in step S55 and step S57 as assignment result notifying steps of the local sector correspond to the process in step S260, and is performed to notify unscheduled adjacent sectors of the assignment results of the local sector. The processes in step S55 and step S57 are the same in the assignment result of the local sector as the process in step S260.

In addition, the processes in step S52 and step S60 of confirming the presence/absence of the assignment result information about the scheduled sectors correspond to the process in step S230 illustrated in FIG. 11, and are to acquire the information notified in step S55 or step S57 by the downlink scheduler of the scheduled sectors.

In the example illustrated in FIG. 12, as in the case illustrated in FIG. 7, control is returned to step S53 after performing the process in step S52 after step S59 or step S60, and the determining process in step S51 is deleted and control is passed from step S50 to step S53 to obtain the same result.

It is obvious that the variation examples 1 through 3 of the first mode for embodying the invention can be realized in the above-mentioned third mode for embodying the invention.

Next, described below as a variation example 4 is the method of distributing resource blocks in step S53 on the basis of the ratio of the amount of stored transmission data for the FCS terminals to the amount of stored transmission data for the non-FCS terminals.

Assuming that the number of resource blocks corresponding to the amount of stored transmission data for FCS terminals is E, the number of resource blocks corresponding to the amount of stored transmission data for non-FCS terminals is F, and the number of resource blocks of the entire system is Z, the number corresponding to the amount of stored transmission data of the resource blocks for FCS terminals is (E/E+F)*Z, and the number corresponding to the amount of stored transmission data for non-FCS terminals is (F/E+F)*Z.

It is obvious that the number of assigned resource blocks for FCS terminals cannot exceed the upper limit of the number of resource blocks that can be used and not yet assigned to the FCS terminals of the adjacent sectors. Therefore, when a part of the proportional allocation is cut off, and when the amount of stored transmission data for FCS terminals falls below the amount of proportional allocation, the insufficient amount can be assigned to the non-FCS terminals. Therefore, the frequency use efficiency can be improved.

It is also obvious that the variation example 4 can be realized by combining the above-mentioned variation examples 1 through 3.

Figure 13:
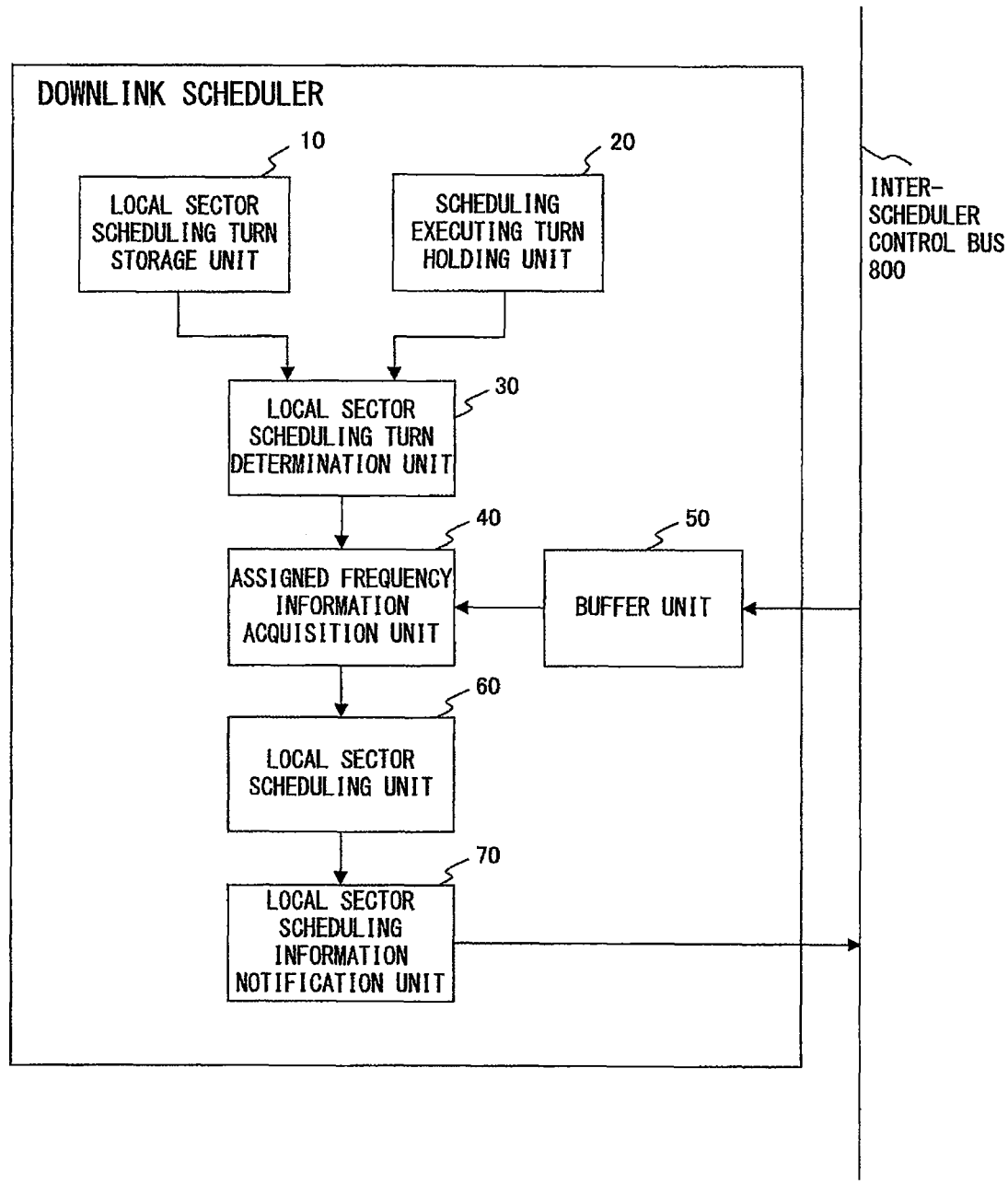
FIG. 13 illustrates an example of the function block configuration of a downlink scheduler.

FIG. 13 illustrates an example of the configuration of the function block of the portion related to the first mode for embodying the invention with the inter-scheduler control bus 800.

As illustrated in FIG. 13, the downlink scheduler is configured by a local sector scheduling turn storage unit 10, a scheduling executing turn holding unit 20, a local sector scheduling turn determination unit 30, an assigned frequency information acquisition unit 40, a buffer unit 50, a local sector scheduling unit 60, and a local sector scheduling information notification unit 70.

The local sector scheduling turn storage unit 10 stores the scheduling turn M of the local sector in the entire sectors.

The scheduling executing turn holding unit 20 stores the count value N counted up each time each sector performs the scheduling in the scheduling cycle for the scheduling of the entire sectors, and holds the scheduling turn N in progress.

The local sector scheduling turn determination unit 30 determines whether or not the scheduling turn of the local sector has been reached on the basis of the value M stored in the local sector scheduling turn storage unit 10 and the value N stored in the scheduling executing turn holding unit 20 in each scheduling cycle of the scheduling of the entire sectors.

The assigned frequency information acquisition unit 40 acquires the frequency assignment information about the scheduled adjacent sectors through the inter-scheduler control bus 800 and the buffer unit 50.

The buffer unit 50 stores the frequency assignment information transmitted from the scheduled adjacent sectors through the inter-scheduler control bus 800.

The local sector scheduling unit 60 performs the scheduling of the local sector using a frequency area not assigned to the adjacent sectors, and assigns a frequency to the terminal of the local sector.

The local sector scheduling information notification unit 70 notifies the unscheduled adjacent sectors whose scheduling turns have not been reached of the result of the frequency assignment about the local sector through the inter-scheduler control bus 800.

In the second and third modes for embodying the invention, it is clear from the description about each of the modes what the configuration of the function block of the downlink scheduler is.

For example, in the second mode for embodying the invention, the buffer unit 50 stores the amount of transmission data of the adjacent sectors, and the information is used by the local sector scheduling unit 60.

It is also clear that the function of the downlink scheduler can be realized by the program of a computer provided with the local sector scheduling turn storage unit 10 and the scheduling executing turn holding unit 20.

The value M stored in the local sector scheduling turn storage unit 10 can be a fixed value, or can be variable for each scheduling cycle as described with reference to the variation examples 1 through 3.

The value N held in the scheduling executing turn holding unit 20 can be counted after the downlink scheduler of the sector for which the scheduling has terminated broadcasts a termination message to the inter-scheduler control bus 800, or can be counted after the notification of the result of the frequency assignment of the local sector is broadcast.

As it is clear from the detailed descriptions above, the frequency can be dynamically assigned from the frequency bands of the entire system for each sector according to the present invention, a high throughput service can be presented to each user, and the quality of services can be improved.

What is claimed is:

1. A method for reducing interference in a wireless communication system, in each scheduling cycle of a scheduling of entire sectors, the method comprising:
   determining whether or not a scheduling turn of a local sector has been reached;
   acquiring frequency assignment information about scheduled adjacent sectors managed by a base station managing the local sector when it is determined that the scheduling turn of the local sector has been reached;
   assigning a frequency to a terminal of the local sector using a frequency area not assigned to adjacent sectors managed by a base station managing the local sector according to the frequency assignment information about the scheduled adjacent sectors; and
   notifying an unscheduled adjacent sector managed by the base station managing the local sector of a result of the frequency assignment of the local sector, wherein
   the method for reducing interference is performed in units of the scheduling cycle of entire sectors forming a cell corresponding to a base station.

2. The method according to claim 1, further comprising:
   acquiring an amount of stored transmission data of the local sector and the unscheduled adjacent sectors, wherein
   the assigning schedules according to ratios of amounts of stored transmission data of the local sector and the unscheduled adjacent sectors in addition to the frequency assignment information about the scheduled adjacent sectors.

3. The method according to claim 1, wherein:
   when handover is implemented between sectors by fast cell selection (FCS) in the wireless communication system, the assigning comprises:
   first scheduling an FCS terminal at scheduled adjacent sectors using the frequency area not assigned to the adjacent sectors according to the frequency assignment information about the scheduled adjacent sectors; and
   second scheduling other terminals using a frequency area other than the assigned frequency.

4. The method according to claim 3, wherein
   the notifying notifies of the frequency assignment information by the second scheduling as a result of the frequency assignment of the local sector.

5. The method according to claim 3, wherein
the notifying notifies of the frequency assignment information to a FCS terminal at the unscheduled adjacent sectors from among the results of the frequency assignment by the second scheduling as a result of the frequency assignment of the local sector.

6. The method according to claim 3, further performing:
acquiring an amount of stored transmission data for an FCS terminal at the scheduled adjacent sectors of the local sector and an amount of stored transmission data for other terminals of the local sector; and
the first scheduling schedules on a basis of a ratio of the amount of stored transmission data for the FCS terminal at the scheduled adjacent sectors of the local sector to the amount of stored transmission data for other terminals of the local sector in addition to the frequency assignment information about the scheduled adjacent sectors.

7. The method according to claim 1, wherein
a sector is defined as a first sector to be scheduled, and a scheduling turn is assigned sequentially to adjacent sectors clockwise or counterclockwise.

8. The method according to claim 7, wherein
the first sector to be scheduled is sequentially changed to adjacent sectors clockwise or counterclockwise in each scheduling cycle.

9. The method according to claim 1, wherein
the first sector to be scheduled is alternately changed between two adjacent sectors in each scheduling cycle.

10. The method according to claim 1, wherein
a scheduling turn of each sector is determined at random in each scheduling cycle.

11. A base station apparatus for performing a communication comprising:
a downlink scheduler provided for each sector which assigns a frequency set in units of a sector forming a cell corresponding to a base station;
an inter-scheduler control bus which couples the schedulers provided for each sector to each other, wherein
each downlink scheduler controls the base station apparatus in accordance with processes comprising:
determining whether or not a scheduling turn of a local sector has been reached in each scheduling cycle of a scheduling of the entire sectors;
acquiring frequency assignment information about scheduled adjacent sectors managed by a base station managing the local sector through the inter-scheduler control bus;
assigning a frequency to a terminal of the local sector using a frequency area not assigned to adjacent sectors managed by a base station managing the local sector according to the frequency assignment information about the scheduled adjacent sectors; and
notifying an unscheduled adjacent sector managed by a base station managing the local sector of a result of the frequency assignment of the local sector through the inter-scheduler control bus.

12. A scheduler which is provided for the base station apparatus according to claim 11 corresponding to a sector and assigns a frequency, comprising:
a scheduling turn storage part which stores a scheduling turn in entire sectors as local sectors;
a scheduling count value holding part which holds a count value counted up each time each sector performs scheduling in the scheduling cycle of scheduling the entire sectors and indicating a current scheduling turn in a scheduling cycle;
a scheduling turn determination part which determines whether or not a scheduling turn of the local sector has been reached on a basis of a value stored in the scheduling turn storage part and a count value stored in the scheduling count value holding part for each scheduling cycle in which the scheduling of the entire sectors is performed;
an assigned frequency information acquisition part which acquires the frequency assignment information about the scheduled adjacent sectors through the inter-scheduler control bus;
a scheduling part which assigns a frequency to a terminal of the local sector using a frequency area not assigned in the adjacent sectors according to the frequency assignment information about the scheduled adjacent sectors; and
a notification part which notifies unscheduled adjacent sectors of the result of the frequency assignment of the local sector through the inter-scheduler control bus.

\* \* \* \* \*